Jan. 8, 1952 F. H. DARRAGH, JR 2,581,365
CRAWLER TRACTOR FRICTION WHEEL DRIVE MECHANISM
Filed Nov. 5, 1947 2 SHEETS—SHEET 1
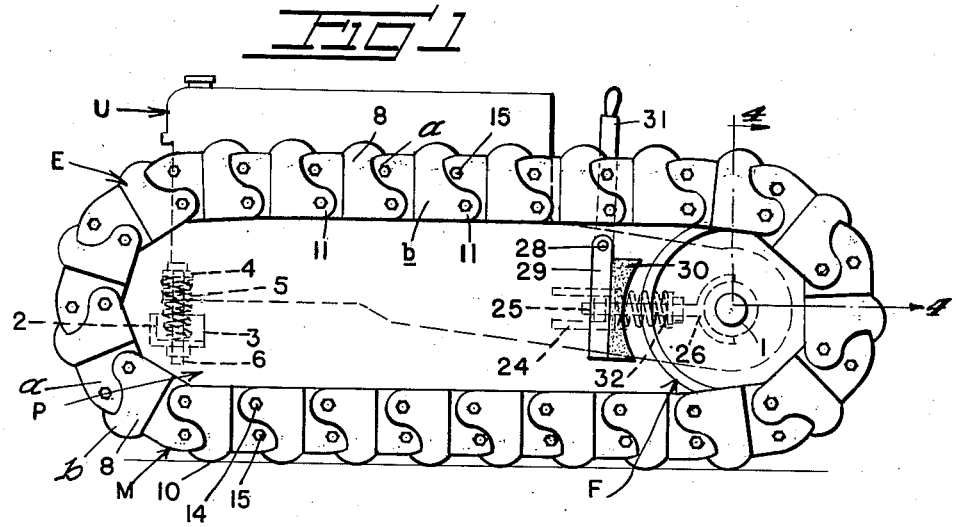
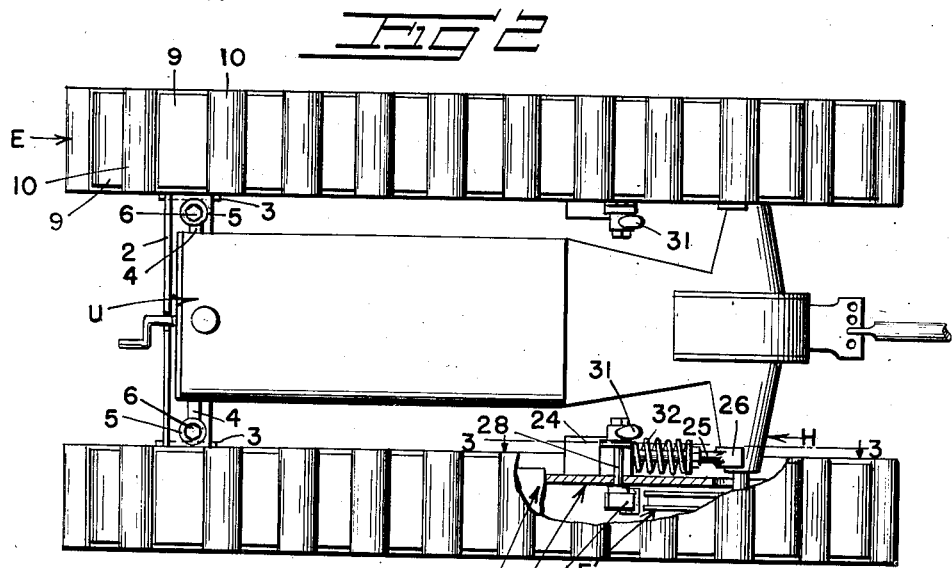
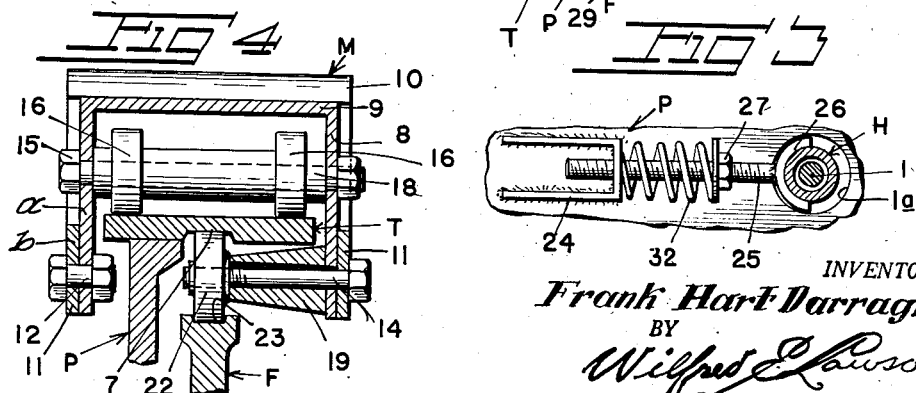
INVENTOR.
Frank Hart Darragh, Jr.
BY
Wilfred Lawson
Attorney

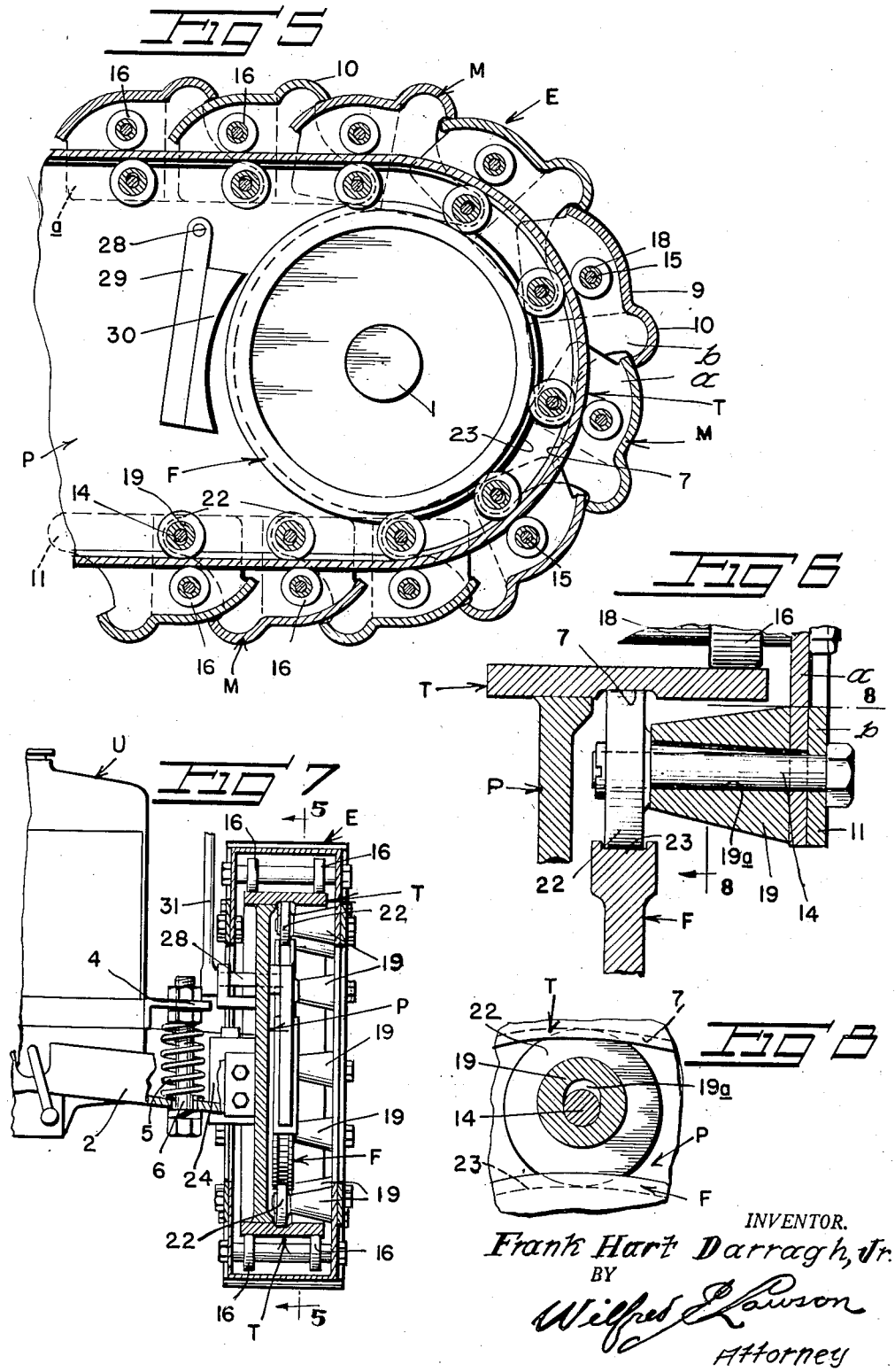

Patented Jan. 8, 1952

2,581,365

UNITED STATES PATENT OFFICE 2,581,365

CRAWLER TRACTOR FRICTION WHEEL DRIVE MECHANISM

Frank H. Darragh, Jr., New Brighton, Pa., assignor of one-half to Charles W. Read, New Castle, Pa.

Application November 5, 1947, Serial No. 784,219

6 Claims. (Cl. 180—9.1)

This invention relates to a crawler tractor and it is primarily an object of the invention to provide a machine of this kind wherein the drive wheels for endless tread members are effectively held in engagement with the tread members of the resistance offered by the load imposed upon the tractor power unit instead of depending upon the weight of the power unit.

A still further object of the invention is to provide a tractor of this kind wherein the drive for the endless members is only at one end.

A still further object of the invention is to provide a tractor of this kind which includes an endless rigid track for each of the endless tread members and wherein the members are operated by a friction drive.

The invention consists in the details of construction and in the combination and arrangement of the several parts of my improved crawler tractor, whereby certain advantages are attained, as will be hereinafter more fully set forth.

In order that my invention may be better understood, I will now proceed to describe the same with reference to the accompanying drawings, wherein:

Figure 1 is a view in side elevation of a crawler tractor constructed in accordance with an embodiment of the invention;

Figure 2 is a view in top plan of Figure 1, with a portion broken away, the power unit being diagrammatically indicated;

Figure 3 is an enlarged detailed sectional view taken substantially on the line 3—3 of Figure 2;

Figure 4 is an enlarged detailed sectional view taken substantially on the line 4—4 of Figure 1;

Figure 5 is an enlarged fragmentary view taken lengthwise through the rear portion of a tread element on a line outwardly of a friction wheel, with the section being substantially on the line 5—5 of Figure 7;

Figure 6 is an enlarged fragmentary transverse sectional view particularly illustrating a mounting for one of the inner rollers;

Figure 7 is a fragmentary view partly in front elevation and partly in section of Figure 1; and Figure 8 is a fragmentary detailed sectional view taken substantially on the line 8—8 of Figure 6.

As disclosed in the accompanying drawings, P denotes side plates, preferably of metal, and substantially flat with the flat faces thereof vertically disposed when the plates are in applied position.

Each of the plates P as here disclosed is of a length slightly in excess of the length of the associated power unit U which may be of any preferred type but of course including a rear and laterally directed housing H for the rear axles I which are driven and controlled in a conventional manner. It is not believed necessary that a detailed description and illustration of the power unit is necessary.

The plates P when applied are substantially parallel although there may be some variations in this relation without effecting efficiency. The rear portions of the plates P are freely mounted on the rear axle I of the power unit U by providing a large opening Ia therein for the axle whereby said plates will have up and down swinging movement and also endwise movement within certain limitations.

The forward end portions of the plates P are connected and maintained in desired space relation by an interposed crossed member 2 which may be an angle iron or otherwise as may be preferred. Fixed to rotate with the axles I and mounted thereon outwardly of the plates P are the friction drive wheels F.

The forward portion of each of the plates P has welded or otherwise rigidly secured to the inner face thereof, an outstanding bracket 3 which underlies an outstanding bracket 4 carried by the lower forward portion of the unit U. Interposed between these brackets 3 and 4 is an expansible member 5 herein disclosed as a coil spring of requisite tension and which freely surrounds a retaining bolt 6, inserted through the brackets 3 and 4 and having endwise movement. This mounting for the forward end portion of the plate P permits the plate to have vertical swinging movement within certain limitations but it is to be pointed out that the tension of spring 5 is such to withstand upward swinging movement under normal conditions of travel.

Each plate P extends a desired distance at its rear beyond the adjacent friction wheel F and also beyond the adjacent rear end of the unit U while the forward end portion of the plate P extends a desired distance in advance of the unit U. The edge of the rearwardly extended portion of the plate P is substantially semicircular and concentric with respect to the associated axle. The edge of the forwardly extended portion of the plate P is arranged on a similar curvature.

Welded or otherwise rigidly secured to the marginal or edge portion of each of the plates P is a track member T substantially straight in cross section and which extends continuously around the plate P to provide an endless track member. This track member T as disclosed extends a material distance outwardly of its associated plate P, as particularly illustrated in Figure 6 of the drawings. The under surface of the track member T outwardly of the plate P but preferably closely adjacent thereto is provided with a continuous groove 7 to provide a trackway.

Travelling along the track T is an endless traction element E comprising a plurality of tread members M of substantially duplicate structure. These tread members may of course be of such number desired.

Each of the members M comprises side plates 8 connected at their outer margins by a top plate 9. The rear portion of the plate 9 is provided transversely thereacross with an outstanding traction cleat 10 herein disclosed as pressed outwardly of the top plate 9. The forward portions $a$ of the plates 8 of each of the members M are spaced apart less than the rear portions $b$ of the plates 8 of an adjacent member and are between the outwardly disposed ears 11 carried by the inner or free portions of the plates 8 and which ears are pivotally connected to the portions $a$ of a succeeding member by the bolts 12 and 14 whereby adjacent members M are connected for relatively swinging movement to allow the elements E to readily pass around the end curved portions of the track T. The outer or free portions of the top plate 9 and the adjacent parts at the side plates 8 are disposed outwardly and inwardly on a curvature substantially concentric to the mounting afforded by the bolts 12 and 14 to allow for the desired articulation.

The portions $a$ of the side plate 8 of each of the members M and in relatively close proximity to the top plate 9 has secured thereto the transverse bolt 15 which bridges the space between the plate 8. Rotatively mounted on this bolt 15 are the rollers or wheels 16 which have rolling contact upon the outer face of the track member T and preferably adjacent to the side margins thereof as shown in Figure 4 of the drawing. These rollers or wheels 16 are maintained in desired position by the spacer sleeves 18.

The side plates 8 of the members M extend a material distance inwardly of the track member T and with the pivot bolts 12 and 14 located inwardly of such track member.

The pivot bolt 14 is of a length to extend inwardly of its associated plate 8 and a conoidal block or post 19 which extends to the groove or trackway 7 on the under surface of the track member T. This block or post 19 is welded or otherwise rigid with the associated side plate 8.

On the end of bolt 14 is freely mounted a roller 22 which has rolling contact from below with the track member T and rides in the trackway or groove 7. This roller or wheel 22 is preferably substantially midway of the adjacent outer rollers or wheels 16 so relatively spaced to assure the maintenance of the rollers or wheels 16 and 22 in desired rotating engagement with the opposite faces of the track member T.

The rollers or wheels of all of the members M have close frictional contact with the peripheries of the friction wheels F and for which reason the peripheries thereof around are provided with grooves 23 in which the rollers or wheels 22 are received. The frictional contact of the wheels or rollers 22 with the frictional wheels F and with the under surface of the tread member T when the axles 1 are driven by the power unit will result in the desired travel of the endless traction members E.

It is to be particularly noted that the drive for the members E is at one end only and it is to be further and particularly pointed out that the working load imposed upon the power unit U either by pull at the rear or push at the front will positively force and maintain the friction wheels F against the rollers or wheels 22 instead of depending upon the weight of the power unit as a result of the rearward endwise movements of the plates P.

The plates P may also be manually adjusted lengthwise to regulate the desired frictional engagement between the wheels F and the rollers 22 by providing the rear portion of each of the plates P with an inwardly disposed bracket 24 positioned in advance of the housing H and through which extends an end portion of an elongated threaded shank or heavy duty bolt 25. This shank or bolt 25 is provided with a yoke head 26 which bears against the adjacent portion of the housing H. Threading upon the shank or bolt 25 behind the bracket 24 is a nut 27 between which and the bracket 24 is a heavy coil spring 32. Upon turning the nut 27 in one direction pressure will be applied to the spring and the associated plate P will be advanced as desired to effect the desired frictional engagement with the associated wheel F.

Pivotedly mounted, as at 28, on the upper portion of each of the plates P and inwardly thereof is a swinging brake arm 29 carrying a conventional brake shoe 30 for coaction with a wheel F. The pivotal mounting 28 as herein embodied comprises a rock shaft to which is affixed an upstanding hand lever 31. It is to be stated that the means for operating the brake in detail forms no part of the invention.

By having an individual brake or transmission mechanism for each of the wheels F, the speed of the tread members M can be independently controlled and thus allow for the desired steering of the tractor.

Each of the shanks or heavy duty bolts 25 has free movement through the bracket 24 and interposed between the bracket 24 and the nut 27 is an expansible member 32 of requisite tension and herein disclosed as a coil spring encircling the shank or bolt 25. By this arrangement is assured a smooth and steady contact between a drive wheel F and the coacting rollers 22. Desired turning of the nut permits regulation of the tension of the spring 32 as determined by the requirements of practice.

Due to the planetary disposition of the rollers 22 in relation to the drive wheels F, said rollers travel at a peripheral speed twice as fast as the speed of the tractor. This affords a two to one speed ratio and a one to two power ratio or in other words, one pound of peripheral force yields two pounds of force to move the tractor, discounting frictional loss. Thus my arrangement is much more efficient than direct contact between a smooth drive wheel and a crawler tread.

Each of the bolts 15 is offset with respect to the bolts 12 and 14 so that each of the rollers 22 will be set on an angle from the associated rollers 16 to allow uniform thickness of track.

It is to be especially noted that adjacent tread members are pivotally connected by shafts in the form of bolts 12 and 14 inwardly of the track T thus eliminating the necessity of resilient couplings as the members do not have to travel around a radius greater than the radius at each end of a side plate or member P, thus allowing the rollers 22 to be evenly spaced at all times. Furthermore, this even spacing allows the rollers 22 to be tightly engaged between wheel F and the curved end portions of the track T.

Openings or bores 19a are formed through the posts or blocks 19, which are larger at their outer ends than the shaft diameter and are slightly elongated toward the roller or inner ends, to a substantially elliptical form, so that there is sufficient play to allow the rollers 22 to be squeezed tightly between the wheel F and the track E even at the point where the roller 22 may be pressed upwardly by ground resistance.

The thickness of the track T can be uniform all the way around because of the fact that the rollers 22 and rollers 16 are not directly above each other but are set at an angle which is determined by the radius of the curved end of a side plate or member P in relation to the length of each tread member M. The angle is such as to cause the rollers 16 and the rollers 22 to be correctly spaced at any position of the members M on the track T.

The structure of each of the tread members M is such to afford a substantially enclosed structure and adjacent members M overlap sufficiently to keep out dirt or the like.

From the foregoing description it is thought to be obvious that a crawler tractor constructed in accordance with my invention is particularly well adapted for use by reason of the convenience and facility with which it may be assembled and operated.

I claim:

1. A tractor structure of the character described comprising a power unit having laterally projecting axles, a long plate body extending lengthwise of each side of the power unit with its longitudinal margins vertically spaced and having each end edge substantially semi-circular, a continuous track plate encircling each long plate and secured to the periphery thereof, the track plate projecting laterally beyond a vertical face of the supporting plate body, each of said plate bodies having an axle extending therethrough concentric with one semi-circular edge of the plate body, means coupling the forward end of each plate body with the adjacent part of the power unit whereby vertical swinging movement of the plate body with the adjacent part of the power unit whereby vertical swinging movement of the plate body relative to the power unit is permitted, an endless traction element encircling each track plate and comprising a plurality of pivotally coupled tread members, a roller carried by each of the tread members and engaging the outer face of the track plate, a roller carried by each of the tread members and having rolling contact with the inner face of the track plate, a friction wheel secured upon each of the axles and having its periphery in spaced relation with the inner face of the track plate, and each of said last mentioned rollers being adapted to pass between the periphery of the adjacent wheel and the inner face of the track plate for simultaneous driving contact with the wheel periphery and track plate.

2. A tractor structure of the character described in claim 1, wherein each of the plate bodies has an opening through which the adjacent axle passes, said opening being of a size to permit lengthwise movement of the plate body relative to the axle, adjustable means connected between each plate body and an adjacent part of the power unit for imposing a longitudinal thrust upon the plate body, and the said means connecting the forward end of each plate body with the power unit comprising a yieldable element normally resisting vertical swinging movement of the forward end of the plate body.

3. A tractor structure of the character described comprising a relatively long power unit, a pair of driving axles extending laterally from the unit, a wheel mounted upon each axle, a long plate body disposed longitudinally of each side of the power unit with its longitudinal edges vertically spaced, each plate body having an opening through which an axle passes, each of said plate bodies further having each end substantially semi-circular, each axle being concentric with the semi-circular end edge of the adjacent plate and the wheel having a radius less than the radius of the said semi-circular end edge, a relatively wide track plate encircling each plate body upon the periphery thereof and projecting laterally beyond the outer side face of the plate body, an endless traction element encircling each track plate and comprising a plurality of tread members pivotally coupled together, a pair of rollers carried by each tread member and positioned upon the outer side of the track plate and spaced transversely thereof, and a friction drive roller carried by each tread member and positioned to engage the inner face of the track plate to move therealong in a plane passing between the pairs of rollers, the said friction drive rollers contacting the inner face of the track plate being of a diameter to pass between the track plate and the periphery of a wheel and frictionally contact both the plate and the wheel.

4. A tractor structure of the character described in claim 3, wherein said tread members have coacting overlapping portions between which the track plate is positioned, a long block rigidly secured at one end to one of the said portions of each tread member and projecting inwardly beneath the track plate, a shaft extending through said block and through the adjacent overlapping portions of a pair of tread members, and said last mentioned shaft carrying upon its inner end one of the said friction drive rollers having contact with the inner side of the track plate.

5. A tractor structure of the character described in claim 3, wherein said tread members have coacting overlapping portions between which the track plate is positioned, a long block rigidly secured at one end to one of the said portions of each tread member and projecting inwardly beneath the track plate, a shaft extending through each of said blocks and through the adjacent overlapping portions of a pair of tread members, and said last mentioned shaft carrying upon its inner end one of the said friction drive rollers having contact with the inner side of the track plate, each of said blocks and the part of the said tread portion to which it is secured having the passage through which the last mentioned shaft passes gradually altering from a circular form at its outer end larger than the shaft diameter, to an elliptical form at the inner end adjacent to the roller with the long axis of the elliptical end extending perpendicular to the direction of movement of the tread member.

6. A tractor structure of the character described in claim 1, with yieldable means coupling each plate body with a part of the adjacent tractor unit for resisting rearward movement of the plate body relative to the adjacent axle, means for increasing the resistance to the said rearward movement of the plate body, and the said means coupling the other ends of the plate bodies to the power unit comprising a cross member connecting the plate bodies together across the front of the power unit, a bracket carried by the power unit adjacent to each plate body and disposed above the cross member, a bolt connecting each bracket with the cross member and permitting vertical movement of the cross member relative to the adjacent overlying bracket, and a spring encircling each bolt and interposed between the cross member and the overlying bracket.

FRANK H. DARRAGH, Jr.

REFERENCES CITED

The following references are of record in the file of this patent:

UNITED STATES PATENTS

| Number | Name | Date |
|---|---|---|
| 1,276,929 | Johnson | Aug. 27, 1918 |
| 1,278,931 | Houghton | Sept. 17, 1918 |
| 1,485,104 | White et al. | Feb. 26, 1924 |
| 1,522,157 | Tracy et al. | Jan. 6, 1925 |
| 1,661,649 | Best | Mar. 6, 1928 |
| 2,308,327 | Darragh, Jr. | Jan. 12, 1943 |